US012742122B2

(12) United States Patent
Brita et al.

(10) Patent No.: US 12,742,122 B2
(45) Date of Patent: Sep. 22, 2026

(54) PLASTIC DEPOLYMERIZATION USING SILICA BASED CATALYSTS

(71) Applicant: Basell Poliolefine Italia S.r.l., Milan (IT)

(72) Inventors: Diego Brita, Ferrara (IT); Simona Guidotti, Ferrara (IT); Dario Liguori, Ferrara (IT); Francesco Menichelli, Ferrara (IT); Sandor Nagy, Seabrook, TX (US); Noel C. Hallinan, Loveland, OH (US)

(73) Assignee: Basell Poliolefine Italia S.r.l., Milan (IT)

( * ) Notice: Subject to any disclaimer, the term of this patent is extended or adjusted under 35 U.S.C. 154(b) by 150 days.

(21) Appl. No.: 18/708,524

(22) PCT Filed: Nov. 15, 2022

(86) PCT No.: PCT/EP2022/081882
§ 371 (c)(1),
(2) Date: May 8, 2024

(87) PCT Pub. No.: WO2023/088861
PCT Pub. Date: May 25, 2023

(65) Prior Publication Data

US 2024/0327715 A1 Oct. 3, 2024

Related U.S. Application Data

(60) Provisional application No. 63/280,241, filed on Nov. 17, 2021.

(30) Foreign Application Priority Data

Nov. 22, 2021 (EP) .................................... 21209510

(51) Int. Cl.

| | |
|---|---|
| ***C10B 53/07*** | (2006.01) |
| ***B01J 21/08*** | (2006.01) |
| ***B01J 23/30*** | (2006.01) |
| ***C08J 11/16*** | (2006.01) |
| ***C10B 57/06*** | (2006.01) |

(52) U.S. Cl.
CPC ............... *C10B 53/07* (2013.01); *B01J 21/08* (2013.01); *B01J 23/30* (2013.01); *C08J 11/16* (2013.01); *C10B 57/06* (2013.01); *C08J 2323/06* (2013.01); *C08J 2423/12* (2013.01)

(58) Field of Classification Search
CPC .. C10B 53/07; C08J 11/04; C08J 11/10; C08J 11/16
See application file for complete search history.

(56) References Cited

U.S. PATENT DOCUMENTS

| | | | | |
|---|---|---|---|---|
| 4,530,754 | A | 7/1985 | Shiroto et al. | |
| 8,664,458 | B2 * | 3/2014 | Kumar ..................... | C08J 11/16 201/21 |
| 10,000,715 | B2 * | 6/2018 | Kumar ..................... | C08J 11/10 |
| 10,537,876 | B2 | 1/2020 | Streiff et al. | |
| 2012/0016169 | A1 | 1/2012 | Kumar | |
| 2015/0361374 | A1 | 12/2015 | Kumar et al. | |
| 2018/0371326 | A1 | 12/2018 | Streiff et al. | |

FOREIGN PATENT DOCUMENTS

| | | | |
|---|---|---|---|
| EP | 0873191 | A1 | 10/1998 |
| JP | S57205484 | A | 12/1982 |
| JP | H08253773 | A | 10/1996 |
| JP | H0959647 | A | 3/1997 |
| JP | H09302357 | A | 11/1997 |
| WO | 2014110644 | A1 | 7/2014 |

OTHER PUBLICATIONS

Amélie Thomas, Céline Dablemont, Jean-Marie Basset, Frédéric Lefebvre, "Comparison of H3PW12040 and H4SiW12040 heteropolyacids supported on silica by 1H MAS NMR", Comptes Rendus Chimie, vol. 8, Issues 11-12, 2005, ISSN 1631-0748, https://doi.org/10.1016/j.crci.2005.06.006.*

Billy B. Bardin, Robert J. Davis, C"haracterization of copper and vanadium containing heteropolyacid catalysts for oxidative dehydrogenation of propane", Applied Catalysis A: General, vol. 185, Issue 2, 1999, pp. 283-292, ISSN 0926-860X, https://doi.org/10.1016/S0926-860X(99)00174-X.*

Yoshihisa Matsumoto, Search for Plastic Decomposition Catalyst Using TG/DTA, Proceedings of the First Symposium on Plastic Chemical Recycling Study Group, Nov. 25, 1998, pp. 59-60.

The International Search Report and The Written Opinion for PCT/EP2022/081882 mailed Mar. 13, 2023.

Yalcin; Performance of TPA Loaded SBA-15 Catalyst in Polypropylene Degradation Reaction; Dec. 12, 2019; XP055921048; Retrieved from the Internet URL: https://etd.lib.metu.edu.tr/upload/12625098/index.pdf.

Aydemir et al.; Synthesis of TPA Impregnated SBA-15 Catalysts and Their Performance in Polyethylene Degradation Reaction; American Institute of Chemical Engineers Journal, vol. 58, No. 8, Aug. 1, 2012, pp. 2466-2472, XP055920925, US ISSN: 0001-1541, DOI: 10.1002/aic. 12763.

(Continued)

*Primary Examiner* — Jonathan Luke Pilcher

(57) ABSTRACT

A process for depolymerizing plastic waste including the steps of: a) providing a melt plastic waste feedstock made from or containing recycled polypropylene and polyethylene; and b) subjecting the melt product obtained in (a) to a temperature ranging from 280° C. to 600° C., thereby obtaining a depolymerization product; wherein the melt product, the depolymerization product, or both are contacted with a catalyst made from or containing a supported heteropolyacid, having a transition metal portion containing transition metals selected from the group consisting of W, Mo, and V and a non-metal portion containing non-metal elements selected from the group consisting of Si, P, and As.

15 Claims, No Drawings

(56) References Cited

OTHER PUBLICATIONS

Beltramini et al.; Catalytic Conversion of Municipal Waste Plastic into Gasoline-Range Products over Mesoporous Materials; China Particuology, Elsevier, NL, vol. 4, No. 2, Apr. 1, 2006, pp. 80-82, XP022937319, ISSN: 1672-2515, DOI: 10. 1016/S1672-2515(07)60240-1.
Jalil; Investigations on Polyethylene Degradation into Fuel Oil over Tungstophosphoric Acid Supported on MCM-41 Mesoporous Silica; Journal of Analytical and Applied Pyrolysis, vol. 65, No. 2, Dec. 1, 2002, pp. 185-195, XP055920933, NL ISSN:0165-2370, DOI:10. 1016/S0165-2370(01)00193-0.
Attique et al.; Highly Efficient Catalytic Degradation of Low-Density Polyethylene Using a Novel Tungstophosphoric Acid/Kaolin Clay Composite Catalyst; Turkish Journal of Chemistry; vol. 42, No. 3, Feb. 1, 2018, XP055921043, Turkey ISSN: 1300-0527, DOI: 10.3906/kim-1612-21.

* cited by examiner

PLASTIC DEPOLYMERIZATION USING SILICA BASED CATALYSTS

This application is the U.S. National Phase of PCT International Application PCT/EP2022/081882, filed Nov. 15, 2022, claiming benefit of priority to European Patent Application No. 21209510.3, filed Nov. 22, 2021, and to U.S. Provisional Patent Application No. 63/280,241, filed Nov. 17, 2021, the disclosures of which are incorporated herein by reference in their entirety.

FIELD OF THE DISCLOSURE

In general, the present disclosure relates to the field of chemistry. More specifically, the present disclosure relates to polymer chemistry. In particular, the present disclosure relates to a catalytic method for depolymerizing plastic feedstock, and to a catalyst for the depolymerization.

BACKGROUND OF THE DISCLOSURE

For some applications, plastics are inexpensive and durable materials for manufacturing a variety of products. As such, the production of plastics has increased dramatically over the last decades. In some instances, the durability of the plastics contributes to an increase in the amount of plastics in landfill sites and natural habitats. In some instances, degradable and biodegradable plastics persist depending on environmental factors, such as ultraviolet light exposure, temperature, and the presence of microorganisms.

Currently, plastic recycling primarily includes mechanical recycling and chemical recycling. With mechanical recycling, plastics are transformed without changing their chemical structure and may be used to produce new materials. In some instances, mechanical recycling steps include: collecting plastic wastes; sorting plastic wastes by type and color; pressing or milling plastics for packaging plastics; washing and drying plastics; and reprocessing plastics into pellets by agglutinating, extruding, and cooling the plastics. In some instances, the plastics are polyolefins such as polyethylene (PE) and polypropylene (PP).

Alternatively, chemical recycling modifies the structure of plastics, thereby permitting use of the resulting plastics as raw material for different industries or as a basic input or feedstock for manufacturing new plastic products. In some instances, chemical recycling steps include: collecting plastics and heating the plastics to a temperature at which the polymers break down into fragments. In some instances, this process is referred to as depolymerization and converts the plastic waste material to liquid fuel by thermal degradation (cracking) in the absence of oxygen. In some instances, plastic waste is first melted within a stainless steel chamber, under an inert purging gas. Next, the molten material is heated to a gaseous state. Then, the gaseous material is drawn and condensed in one or more condensers, thereby yielding a hydrocarbon distillate made from or containing straight and branched chain aliphatic, cyclic aliphatic, and aromatic hydrocarbons. In some instances, the resulting mixture is used as a fuel. In some instances, the resulting mixture is used as a feedstock in a thermocatalytic process for obtaining refined chemicals such as monomers.

SUMMARY OF THE DISCLOSURE

In a general embodiment, the present disclosure provides a process for depolymerizing plastics, including the steps of:

a) providing a melt plastic waste feedstock made from or containing recycled polypropylene and polyethylene; and b) subjecting the melt product obtained in (a) to a temperature ranging from 280° C. to 600° C., thereby obtaining a depolymerization product;

wherein the melt product, the depolymerization product, or both are contacted with a catalyst made from or containing a supported heteropolyacid, having a transition metal portion containing transition metals selected from the group consisting of W, Mo, and V and a non-metal portion containing non-metal elements selected from the group consisting of Si, P, and As.

In some embodiments, the amount of catalyst used ranges from 0.1 to 20 wt. %, alternatively 0.1-10 wt. %, alternatively from 0.1 to 5 wt. %, with respect to the total weight of plastic waste feedstock and catalyst.

In some embodiments, the plastic waste feedstock is made from or containing a mixture of polyethylene and polypropylene in a weight ratio 85:15 to 15:85, alternatively 80:20 to 20:80. In some embodiments, the polyethylene is selected from the group consisting of high density polyethylene (HDPE), low-density polyethylene (LDPE), and linear low density polyethylene (LLDPE). In some embodiments, the polypropylene (PP) is a propylene homopolymer or a propylene copolymer, having a lower amount of ethylene, butene, or both. In some embodiments, the feedstock is made from or containing other polyolefins like polybutene. In some embodiments, the feedstock is further made from or containing other polymeric materials. In some embodiments, the other polymeric materials are selected from the group consisting of polystyrene (PS), ethyl-vinyl acetate copolymer (EVA), ethyl-vinyl alcohol copolymer (EVOH), polyvinyl chloride (PVC), and mixtures thereof. In some embodiments, the feedstock is made from or containing more than 80% wt of a mixture between polyethylene and polypropylene, wherein polypropylene accounts for more than 50% wt of the polypropylene/polyethylene mixture.

In some embodiments, the depolymerization process occurs in an oxygen-free environment. In some embodiments, an oxygen containing atmosphere is not introduced into the depolymerization system. In some embodiments, the barrier to the potentially oxygen-containing atmosphere is obtained with a series of expedients. In some embodiments, the series of expedients is selected from the group consisting of nitrogen blanketing and a vacuum system connected to a barrel of the extruder.

In some embodiments, the plastic feedstock mixture is charged into the feeding system of the depolymerization reactor a hopper, or two or more hoppers in parallel. In some embodiments, the oxygen present in the atmosphere of the plastic waste material is eliminated inside the hopper(s).

In some embodiments, the plastic feedstock is fed directly into the depolymerization reactor for small scale tests. In some embodiments and for larger scale, the plastic feedback is fed to the depolymerization reactor by an extruder.

In some embodiments, the plastic scrap is melted and then injected into the depolymerization reactor. In some embodiments, the extruder receives the plastic scrap cut in small pieces into the feed hopper, conveys the stream in the melting section, and heats the polymer by combined action of mixing energy and heat supplied by barrel heaters. In some embodiments, the melting temperature ranges from 250° C. to 350° C.

In some embodiments, additives are incorporated in the melt. In some embodiments, the additives reduce corrosivity of plastic scrap or improve depolymerization efficiency.

In some embodiments and during the extrusion, one or more degassing steps remove residual humidity present in the product.

In some embodiments and before being fed to the reactor, the melt stream is filtered, thereby removing solid impurities from the plastic waste.

In some embodiments, the extrusion systems are selected from the group consisting of single screw extruders, twin screw extruders, twin screw extruders with gear pump, and combinations thereof.

In some embodiments, mixing of the plastic waste feedstock and catalyst takes place directly into the depolymerization reactor or beforehand outside the reactor. In some embodiments, the mixing takes place in the depolymerization reactor, wherein the catalyst is fed (a) by directly pouring the solid catalyst into the reactor under a nitrogen atmosphere or (b) in a form of a liquid hydrocarbon slurry or a semisolid paste using dedicated devices.

In some embodiments, the mixing takes place outside the depolymerization reactor, wherein the catalyst is mixed with plastic scrap in a homogenizer apparatus and the mixture is then pelletized. In some embodiments, the pellets are further made from or containing other additives. In some embodiments, the pellets are charged to the extruder hopper, which is used to feed the polymerization reactor. In some embodiments, the plastic scrap and catalysts are charged separately into the hopper. In some embodiments, the mixing takes place into the extruder at the time of plastic scrap melting, and the mixture is subsequently fed to the depolymerization reactor.

In some embodiments, the depolymerization reactor is an agitated vessel, operated at temperature ranging from 300° C. to 550° C., alternatively from 350° C. to 500° C., alternatively from 350° C. to 450° C., with an inlet for plastic feedstock and catalyst and an outlet for the gaseous depolymerization product.

In some embodiments and as a result of the depolymerization process, a gaseous stream is generated and sent to a condensation unit, which totally or partially liquifies the stream.

In some embodiments, the condensation section receives effluent gases from the depolymerization reactor and partially condenses the gases into an oily depolymerized product made from or containing hydrocarbons. In some embodiments, a fraction of incondensable gases is collected and stored separately. In some embodiments, the condensation section has one or more stages. In some embodiments, the stages are operated under pressure. In some embodiments, the stages are operated at different temperatures. In some embodiments, the operating conditions of the number of stages, pressure, or temperature permit recovery of the maximum amount of products, according to the volatility of the resulting formed compounds. In some embodiments, the temperature range varies depending on the operating pressure.

In some embodiments, the condensation section has at least two condensation stages. In some embodiments, the condensation stages are operated at descending temperatures. In some embodiments and with small scale equipment, the first condensation stage is operated at a temperature range of 100-120° C. and the second condensation stage is operated at a temperature range of from 2° C. to −20° C.

In some embodiments, the depolymerization product coming from the condensation stage is subjected to a second depolymerization stage carried out in the presence of the supported heteropolyacid. In some embodiments, the second depolymerization stage is carried out under conditions similar to the first depolymerization stage. In some embodiments, the catalyst and part of the liquid or semiliquid mass are recycled to the first depolymerization reactor from which the solid residue is discharged. In some embodiments, the gaseous effluent is condensed in a subsequent condensation stage under conditions similar to the first depolymerization step.

In some embodiments and at the end of the process, at least 80% wt., alternatively at 90% wt., of the plastic feedstock is converted into a liquid or gaseous depolymerization product.

In some embodiments, the depolymerization product is used as a cracker feedstock. In some embodiments, the depolymerization product is a liquid depolymerization product. In some embodiments, the amount of liquid depolymerization product is higher than 60% wt, alternatively from 65 to 85% wt, of the plastic waste feedstock.

In some embodiments, the liquid depolymerization product is made from or containing a very low amount of fractions with C28 or higher. In some embodiments, the liquid depolymerization product is free of fractions with C28 or higher. In some embodiments, the liquid depolymerization product is made from or containing an amount of the higher than C28 fraction equal to, or lower than, 4% wt, alternatively lower than 3% wt, alternatively lower than 2% wt, with respect to the total amount of liquid depolymerization product.

In some embodiments, the depolymerization oil has low values of C6-C8 aromatics and Internal Olefin Index (I.O.I.). As used herein, the term "Internal Olefin Index (I.O.I.)" refers to the molar ratio between internal double bonds with respect to double bond in chain end position (alfa-olefins). In some embodiments, the liquid depolymerization product has an I.O.I. no more than 1, alternatively lower than 1, alternatively lower than 0.5.

As used herein, the term "C6-C8 aromatics" refers to a hydrocarbon with sigma bonds and delocalized pi electrons between carbon atoms forming a circle, wherein total of 6 to 8 carbon atoms are present.

In some embodiments, the catalyst is made from or containing a heteropolyacid deposited on a support.

In some embodiments, heteropolyacids belong to a class of compounds of complex oxygen-containing acids formally deriving from two or more different inorganic acids by elimination of water from two or more molecules of the acids. In some embodiments, an acid is formed by combination of several molecules of an acid anhydride of a transition metal and another acid is derived from a non-metal anhydride. In some embodiments, the acid anhydride of transition metal is molybdenum trioxide or tungsten trioxide. In some embodiments, the non-metal of the non-metal anhydride is phosphorus or silicon.

In some embodiments, the support is selected from inorganic oxides, alternatively from $Al_2O_3$, $SiO_2$, and $TiO_2$. In some embodiments, the support is $Al_2O_3$ or $SiO_2$. In some embodiments, the heteropolyacid has the formula Hn [XM12040], wherein X is a heteroatom selected from the group consisting of Si, P, and As, M is a transition metal selected from the group consisting of W, Mo, and V, and n is a number balancing the remaining negative valences of oxygen atoms.

In some embodiments, the transition metal compound is W or Mo, alternatively W. In some embodiments, additional transition metal compounds (ATMC) are present in amount such that the molar ratio between W or Mo and ATMC ranges from 0.5 to 100, alternatively from 5 to 100, alternatively from 20 to 100. In some embodiments, the heteropolyacid is free of additional transition metal compound (ATMC). In some embodiments, the heteropolyacid has the non-metal element as Si or P, alternatively Si. In some embodiments, the heteropolyacid is supported tungstosilicic acid (TSA). In some embodiments, the heteropolyacid is silica supported TSA.

The amount of heteropolyacid on the support, expressed by the amount of transition metal, ranges from 0.5 to 20 wt %, alternatively from 1 to 15% wt, alternatively from 1.5 to 10% wt, with respect to the total amount of supported catalyst. If the weight heteropolyacid complex is considered, its amount based on the total weight of supported catalyst could range from 1 to 26% wt, alternatively from 1.5 to 20%, alternatively from 2 to 15% wt.

In some embodiments, the catalysts have a content of transition metal from 1 to 15% wt, alternatively from 2 to 12% wt, alternatively from 2 to 7% wt, based on the total weight of the catalyst.

In some embodiments, a poison-suppressing agent is used in association with the catalyst. In some embodiments, the poison-suppressing agent is selected from the group consisting of $Ca(OH)_2$, $Mg(OH)_2$, $Ba(OH)_2$, $Sr(OH)_2$, CaO, phyllosilicates, aluminosilicates, and $Zr(HPO4)_2$. In some embodiments, the poison-suppressing agent is selected from the group consisting of $Zr(HPO4)_2$. $Ca(OH)_2$, and phyllosilicate. In some embodiments, the poison-suppressing agent is bentonite.

Characterization

The properties are determined according to the following methods.

Analytical Methods

Characterization of liquid products: The liquid products from the two traps were characterized by Gas Chromatography (GC) and proton NMR (1H NMR).

The GC analysis of the liquid product was performed using an Agilent 7890 GC (Agilent Technologies, Santa Clara, CA), equipped with a non-polar column and a flame ionization detector. For the GC data, the weight percent for x<nC7 (having boiling point <98° C. named LF1), nC7<x<nC11 (having boiling point 98° C.<BP<203° C. named LF2), nC12<x<nC28 (having boiling point 203° C.<BP<434° C. named LF3), and x>C28 (having boiling point >434° C. named LF4) were used to characterize the liquid product.

NMR data were used to characterize the percent of aromatic protons, paraffinic protons, and olefinic protons in the liquid product. The examples were analyzed with an addition of CDCl3 (0.6 g of depolymerize polymer/metal oxide mixture with 0.4 g of CDCl3). The data were collected on a Bruker AV500 MHz NMR spectrometer (Bruker Corporation, Billerica, MA) at 25° C. with a 5 mm Prodigy probe. One dimension 1H NMR data were processed using TOPSPIN® software (Bruker) with an exponential line broadening window function. Quantitative measurements were performed with a 15 second relaxation delay, a 30° flip angle pulse, and 32 scans, thereby facilitating integrals. The spectral integrations for aromatic, olefinic, and paraffinic protons were obtained and used to quantify relative ratios.

Silicon Dioxide $SiO_2$ (White sand), Aluminum (III) oxide $Al_2O_3$, and Titanium Dioxide $TiO_2$ were commercially available from Sigma Aldrich. CBV400 HY Zeolite was commercially available from Zeolyst International.

Heteropoly acids used in the different examples were commercially available from suppliers such as Merk, Alfa Aesar, and ABCR.

Determination of Al, Ti

The determination of Al, Ti content in the solid catalyst component was carried out via inductively coupled plasma emission spectroscopy on "I.C.P Spectrometer ARL Accuris". The sample was prepared by analytically weighing, in a "Fluxy" platinum crucible", 0.1+0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v $HNO_3$ solution and then analyzed via ICP at the following wavelengths: aluminum, 394.40 nm; titanium, 368.52 nm.

Determination of Si, W

The determination of Si, W content in the solid catalyst component was carried out via inductively coupled plasma emission spectroscopy on "I.C.P Spectrometer Icap 7000". The sample was prepared by analytically weighing, in a plastic 100 mL volumetric flask 0.01-0.10 grams of catalyst. 20 mL of hydrofluoric acid (48%) were diluted at ten percent in demineralized water and added into the flask. Subsequently, a cold solution of 1.5 g of boric acid (purity >99.5%) in 50 mL of demineralized water was also added. Finally, the content of the flask was made up to the mark with demineralized water and mix. The resulting solution was then directly analyzed via ICP at the following wavelengths: tungsten, 224.875 nm; silicon, 212.412 nm.

EXAMPLES

Depolymerization Procedure

Procedure for Depolymerization Test in a 500 ml Round Glass Reactor 30 g of the polymer plastic were loaded in a 500 mL round glass reactor, having three necks equipped with thermocouple and nitrogen inlet. In some instances, the polymer plastic was a virgin resin obtained directly from polyolefin production plants (examples 1-7 and comparative examples 1-3) or real plastic wastes (rpw) from municipal collection previously sorted (Examples 8- and comparative examples).

The real plastic waste was analyzed and determine to be made from or containing about 97 wt % of polyolefin, wherein the PP/PE ratio was about 30/70), with the residual containing traces of other polymers (PET, PS, PA, PU, or combinations thereof) and inorganic contaminants.

The solid catalyst (2.5 wt % with respect to plastics) was then introduced into the glass reactor. A blank test without any catalyst was performed. Two glass condensers were connected in series and kept at 110° C. and −8° C., respectively, using an oil bath (Cryostat Julabo). The reactor was placed in electrically heating system (mantle bath). The temperature was raised up to 450° C. The pyrolysis process took place. The following experimental parameters were recorded:

L %, sum of the yield of liquid condensable at 110° C.+liquid condensable at −8° C. (with respect to the polymer charged)

S %, yield of solid/waxy residue in the reactor, excluding catalyst (with respect to the polymer charged)

G %, yield in gaseous products not condensable in both condensers (with respect to the polymer charged)

The results are reported in Tables 1 and 2.

Comparative Example 1

A depolymerization run was carried out using virgin polypropylene as a depolymerization feedstock and without using a depolymerization catalyst. The results are reported in Table 1.

Comparative Example 2

A depolymerization run was carried out using virgin polypropylene as a depolymerization feedstock and $SiO_2$ as depolymerization catalyst. The results are reported in Table 1.

Comparative Example 3

A depolymerization run was carried out using virgin polypropylene as a depolymerization feedstock and CBV400 HY Zeolite as depolymerization catalyst. The results are reported in Table 1.

Example 1

Preparation of Silica Modified (32% wt.) with Phosphomolybdic Acid (SiPMo-A)

Into a 250 mL round-bottom flask, equipped with magnetic stirrer, 4.6 g of phosphomolybdic acid hydrate $H_3[P(Mo_3O_{10})_4]\times H_2O$ [MW=1825.25 g/mol (anhydrous basis)] were charged at room temperature and then dissolved in the minimum amount of demineralized water (20 mL). After 15 min stirring at room temperature, 10.0 g of silicon dioxide $SiO_2$ were added. Additional water was slowly added (total amount 150 mL). Stirring was continued for 30 min at room temperature, thereby obtaining a wet homogeneous slurry. The slurry was stirred for 1 h at room temperature, using a rotary evaporator. Subsequently and at first, the solid was dried under stirring using the rotary evaporator, increasing the temperature up to 100° C., and applying vacuum (circa 50 mmHg). Finally, the solid was dried at 105° C. under vacuum for 2 h in an oven. The resulting product was 13.8 g of a free-flowing powder. The resulting catalyst was used in a depolymerization run with virgin polypropylene as a depolymerization feedstock. The results are reported in Table 1.

Example 2

Preparation of Alumina Modified (50% wt.) with Tungstosilicic Acid (AlWSi-A)

Into a 100 mL round-bottom flask, equipped with magnetic stirrer, 4.5 g of tungstosilicic acid hydrate $H_4[Si(W_3O_{10})_4]\times H_2O$ [MW=2878.17 g/mol (anhydrous basis)] were charged at room temperature and then dissolved in the minimum amount of demineralized water (20 mL). After 15 min stirring at room temperature, 4.5 g of aluminum (III) oxide $Al_2O_3$ were added. Additional water was slowly added (total amount 60 mL). Stirring was continued for 30 min at room temperature, thereby obtaining a wet homogeneous slurry. The slurry was then stirred for 1 h at room temperature and then filtered on a G5 frit. Subsequently, the solid was dried at 105° C. under vacuum for 8 h. The resulting product was 6.2 g of a free flowing powder: Al=39.6% wt. The resulting catalyst was used in a depolymerization run with virgin polypropylene as a depolymerization feedstock. The results are reported in Table 1.

Example 3

Preparation of Alumina Modified (50% wt.) with Phosphotungstic Acid (AlPW-A)

Into a 100 mL round-bottom flask, equipped with magnetic stirrer, 4.6 g of phosphotungstic acid hydrate $H_3[P(W_3O_{10})_4]\times H_2O$ [MW=2880.05 g/mol (anhydrous basis)] were charged at room temperature and then dissolved in the minimum amount of demineralized water (20 mL). After 15 min stirring at room temperature, 4.5 g of aluminum (III) oxide $Al_2O_3$ were added. Additional water was slowly added (total amount 60 mL). Stirring was continued for 30 min at room temperature, thereby obtaining a wet homogeneous slurry. The slurry was then stirred for 1 h at room temperature and then filtered on a G5 frit. Subsequently, the solid was dried at 105° C. under vacuum for 8 h. The resulting product was 8.9 g of a free flowing powder: Al=26.4% wt. The resulting catalyst was used in a depolymerization run with virgin polypropylene as a depolymerization feedstock. The results are reported in Table 1.

Example 4

Preparation of Zeolite Beta Modified (50% wt.) with Tungstosilicic Acid (BetaWSi-A)

Into a 250 mL round-bottom flask, equipped with magnetic stirrer, 4.5 g of tungstosilicic acid hydrate $H_4[Si(W_3O_{10})_4]\times H_2O$ [MW=2878.17 g/mol (anhydrous basis)] were charged at room temperature and then dissolved in the minimum amount of demineralized water (20 mL). After 15 min stirring at room temperature, 4.5 g of ZEOLITE H-BETA POWDER were added. Additional water was slowly added (total amount 150 mL). Stirring was continued for 30 min at room temperature, thereby obtaining a wet homogeneous slurry. The slurry was stirred for 1 h at room temperature, using a rotary evaporator. Subsequently and at first, the solid was dried under stirring using the rotary evaporator, increasing the temperature up to 100° C., and applying vacuum (circa 50 mmHg). Finally, the solid was dried at 105° C. under vacuum for 2 h in an oven. The resulting product was 7.9 g of a free flowing powder. Si=19.4% wt., Al=0.6% wt. The resulting catalyst was used in a depolymerization run with virgin polypropylene as a depolymerization feedstock. The results are reported in Table 1.

Example 5

Preparation of Silica Modified (50% wt.) with Tungstosilicic Acid (SiWSi-A)

At room temperature, 9.0 g of tungstosilicic acid hydrate $H_4[Si(W_3O_{10})_4]\times H_2O$ [MW=2878.17 g/mol (anhydrous basis)] were dissolved into a few mL of demineralized water, thereby forming a solution. Separately and in a 250 mL, round-bottom flask, equipped with mechanical stirrer, a slurry was made from or containing 9.0 g of Silica ES70Y and 40 mL of demineralized water. (Silica ES70Y was commercially available from PQ.) At room temperature, the solution was added dropwise to the slurry, thereby yielding a reaction mixture. The reaction mixture was stirred at room temperature for 1 h, thereby obtaining a wet homogeneous slurry. Subsequently, water was removed under stirring using a rotary evaporator, increasing the temperature up to 100° C., and applying progressive vacuum (to circa 5 mmHg). Finally, the solid was dried at 105° C. under vacuum for 2 h in an oven. The resulting product was 12.0 g of a free flowing powder. The resulting catalyst was used in a depolymerization run with virgin polypropylene as a depolymerization feedstock. The results are reported in Table 1.

Example 6

Preparation of Silica Modified (33% wt.) with Phosphotungstic Acid (SiPW-A)

At room temperature, 4.91 g of phosphotungstic acid hydrate $H_3[P(W_3O_{10})_4]\times H_2O$ [MW=2880.05 g/mol (anhydrous basis)] were dissolved into 10 mL of demineralized water, thereby forming a solution. Separately and in a 250 mL, round-bottom flask, equipped with mechanical stirrer, a slurry was made from or containing 10.05 g of Silica ES70Y and 120 mL of demineralized water. (Silica ES70Y was commercially available from PQ.) At room temperature, the solution was added dropwise to the slurry, thereby yielding a reaction mixture. The reaction mixture was stirred at room temperature for 1 h, thereby obtaining a wet homogeneous slurry. Subsequently, water was removed under stirring using a rotary evaporator, increasing the temperature up to 100° C., and applying progressive vacuum (to circa 5 mmHg). Finally, the solid was dried at 105° C. under vacuum for 2 h in an oven. The resulting product was 14.7 g of a free-flowing powder: Si=31.2% wt., W=20.8% wt. The resulting catalyst was used in a depolymerization run with virgin polypropylene as a depolymerization feedstock. The results are reported in Table 1.

Example 7

Preparation of Silica Modified (18% wt.) with Tungstosilicic Acid (SiWSi-A)

Into a 1 L round-bottom flask, equipped with mechanical stirrer, were charged 11.25 g of tungstosilicic acid hydrate $H_4[Si(W_3O_{10})_4]\times H_2O$ [MW=2878.17 g/mol (anhydrous basis)] and dissolved into 20 mL of demineralized water. This solution was stirred for 15 min at room temperature, then 50.0 g of Silica ES70Y was added. (Silica ES70Y was commercially available from PQ.) Demineralized water (120 mL) was added. At room temperature, the resulting reaction mixture was stirred for 2 h, thereby obtaining a wet homogeneous slurry. Subsequently, water was removed under stirring using a rotary evaporator, increasing the temperature up to 75° C., and applying progressive vacuum (to circa 5 mmHg). Finally, the solid was dried at 105° C. under vacuum for 2 h in an oven. The resulting product was 50.5 g of a free flowing powder: Si=36.7% wt., W=12.5% wt. The resulting catalyst was used in a depolymerization run with virgin polypropylene as a depolymerization feedstock. The results are reported in Table 1.

Comparative Example 4

A depolymerization run was carried out using real plastic waste as a depolymerization feedstock and without using a depolymerization catalyst. The results are reported in Table 2.

Example 8

Preparation of Titanium Dioxide with Tungstosilicic Acid (TiWSi-A)

At room temperature and under nitrogen atmosphere, titanium (IV) isopropoxide (Sigma Aldrich, 28.0 mL, d=0.955 g/mL) was charged into a 500 mL round-bottom flask, equipped with mechanical stirrer, and mixed with ethanol (Silcompa, 240 mL, d=0.789 g/mL) for 10 min, thereby obtaining a first homogeneous, hydrolyzed solution of titanium. Then, a 0.28 M HCl aqueous solution (0.33 mL) was slowly added, thereby obtaining a white slurry. At room temperature and into a second 250 mL round-bottom flask, equipped with mechanical stirrer, urea (Merck, 17.2 g), ethanol (Silcompa 109 mL), and deionized water (17.2 mL) were charged, thereby obtaining a colorless solution. This urea-alcohol-water solution (total volume circa 144 mL) was added to the first hydrolyzed solution of titanium (total volume circa 268 mL). At room temperature and under nitrogen atmosphere, the resulting mixture was stirred for few hours. An aliquot of this mixture (205 mL) was taken. A solution of 2.25 g of tungstosilicic acid hydrate $H_4[Si(W_3O_{10})+]\times H_2O$ in 22.5 mL of ethanol (30% wt. of tungstosilicic acid in the final material) was added to the aliquot. A sample was kept in a beaker until dryness and then extracted with distilled water for two days, in a system with continuous stirring, thereby removing urea. Subsequently, the solid was dried at 100° C. under vacuum for 20 h in an oven. The resulting product was 6.0 g of a free-flowing powder: Ti=41.5% wt. The resulting catalyst was used in a depolymerization run with real plastic waste as a depolymerization feedstock. The results are reported in Table 2.

Example 9

Preparation of Silica Modified (20% wt.) with Tungstosilicic Acid (SiWSi-A)

At room temperature, tungstosilicic acid hydrate $H_4[Si(W_3O_{10})_4]\times H_2O$ [62.5 g, 0.0217 mol, MW=2878.17 g/mol (anhydrous basis)] was dissolved into 120 mL of deionized water, thereby obtaining a colorless solution. At room temperature, the solution was stirred for 30 min. At room temperature, 250.8 g of Silica ES70Y was suspended into 1 L of deionized water, into a 2 L round-bottom flask, equipped with mechanical stirrer. The solution of tungstosilicic acid in water was slowly added to the slurry of silica in water. The resulting mixture was stirred for 12 h at room temperature. The final slurry was filtered on a G4 frit. The white solid washed with deionized water and subsequently dried under vacuum at 105° C./24 h. The final compound was a free flowing white powder (275.6 g): Si=35.9% wt., W=5.2% wt. The resulting catalyst was used in a depolymerization run with real plastic waste as a depolymerization feedstock. The results are reported in Table 2.

Example 10

Preparation of Silica Modified (20% wt.) with Phosphotungstic Acid (SiPW-A)

At room temperature, 7.85 g of phosphotungstic acid hydrate $H_3[P(W_3O_{10})_4]\times H_2O$ [MW=2880.05 g/mol (anhydrous basis)] were dissolved into 20 mL of demineralized water, thereby forming a solution. Separately and in a 250 mL, round-bottom flask, equipped with mechanical stirrer, a slurry was made from or containing 39.25 g of Silica ES70Y and 100 mL of demineralized water. (Silica ES70Y was commercially available from PQ.) At room temperature, the solution was added dropwise to the slurry, thereby yielding a reaction mixture. The reaction mixture was stirred at room temperature for 2 h, thereby obtaining a wet homogeneous slurry. Subsequently, water was removed under stirring using a rotary evaporator, increasing the temperature up to 75° C., and applying progressive vacuum (to circa 5 mmHg). Finally, the solid was dried at 105° C. under vacuum for 2 h in an oven. The resulting product was 43.4 g of a free-flowing powder: Si=39.5% wt., W=9.5% wt. The resulting catalyst was used in a depolymerization run with real plastic waste as a depolymerization feedstock. The results are reported in Table 2.

Example 11

Preparation of Silica Modified (18% wt.) with Tungstosilicic Acid (SiWSi-A)

At room temperature, 2.25 g of tungstosilicic acid hydrate $H_4[Si(W_3O_{10})_4]\cdot xH_2O$ [MW=2878.17 g/mol (anhydrous basis)] were dissolved into a few mL of demineralized water, thereby forming a solution. Separately and in a 250 mL, round-bottom flask, equipped with mechanical stirrer, a slurry was made from or containing 10.0 g of Silica ES70Y and 40 mL of demineralized water. (Silica ES70Y was commercially available from PQ.) At room temperature, the solution was added dropwise to the slurry, thereby yielding a reaction mixture. The reaction mixture was stirred at room temperature for 1 h, thereby obtaining a wet homogeneous slurry. Subsequently, water was removed under stirring using a rotary evaporator, increasing the temperature up to 100° C., and applying progressive vacuum (to circa 5 mmHg). Finally, the solid was dried at 105° C. under vacuum for 2 h in an oven. The resulting product was 16.5 g of a free-flowing powder: Si=46.0% wt., W=11.2% wt. The resulting catalyst was used in a depolymerization run with real plastic waste as a depolymerization feedstock. The results are reported in Table 2.

Example 12

Preparation of Silica Modified (20% wt.) with Tungstosilicic Acid (SiWSi-A) and Copper Dichloride (10% wt.)

Into a 250 mL round-bottom flask, equipped with mechanical stirrer, 12.00 g of silica modified (20% wt.) and tungstosilicic acid hydrate were charged at room temperature. (The tungstosilicic acid hydrate was prepared as described in Example 6.) A 0.16 M solution of copper dichloride (1.29 g, MW=134.45 g/mol) into 60 mL of demineralized water was slowly added. At the end of the addition, the temperature was increased up to 80° C. The resulting reaction mixture was stirred at 80° C. for 1 h, thereby obtaining a homogeneous slurry. The slurry was filtered on a G4 frit. The solid was washed with deionized water and subsequently dried under vacuum at 120° C./1 h in an oven. Finally, a calcination step was performed at 550° C./3.5 h in air. The final compound was a free flowing white powder (7.65 g): Si=42.4% wt., W<0.1% wt., Cu=0.5% wt., Cl=85 ppm. The resulting catalyst was used in a depolymerization run with real plastic waste as a depolymerization feedstock. The results are reported in Table 2.

Example 13

Preparation of Silica Modified (20% wt.) with Tungstosilicic Acid (SiWSi-A) and Zinc Dichloride (10% wt.)

Into a 250 mL round-bottom flask, equipped with mechanical stirrer, 12.00 g of silica modified (20% wt.) and tungstosilicic acid hydrate were charged at room temperature. (The tungstosilicic acid hydrate was prepared as described in Example 6.) A 0.48 M solution of zinc dichloride (1.30 g, MW=136.29 g/mol) into 20 mL of demineralized water was slowly added. Subsequently, 30 mL of demineralized water were further added. The temperature was increased up to 80° C. The resulting reaction mixture stirred at 80° C. for 1 h, thereby obtaining a wet homogeneous slurry. Water was then removed under stirring by applying progressive vacuum. The solid was dried under vacuum at 120° C./1 h in an oven. Finally, a calcination step was performed at 550° C./3.5 h in air. The final compound was a free flowing white powder (10.20 g): Si=39.0% wt., W=4.5% wt., Zn=5.05% wt., Cl=1300 ppm. The resulting catalyst was used in a depolymerization run with real plastic waste as a depolymerization feedstock. The results are reported in Table 2.

Example 14

The depolymerization was carried out in a larger scale depolymerization apparatus having a depolymerization reactor consisting of a mechanically agitated (and jacketed for heating) reactor, which was provided with an inlet for the plastic waste coming from the extruder feed, an inlet for the depolymerization catalyst feed, and an outlet for the generated gases. The gases withdrawn from the reactor were conveyed to a condensation unit from which an incondensable gas and a pyrolytic oil were obtained. Thermocouples were positioned into the reactor to monitor and record the temperatures.

The plastic waste feedstock was made from or containing a polyolefin content (97 wt %), traces of other polymers (PET, PS, PA, and PU), and inorganic contaminants.

Before loading in the hopper to feed an extruder, the feedstock was homogenized and pelletized. The extruder was operated at a temperature of 290° C. and discharged continuously into the depolymerization reactor at 4 kg/h. The depolymerization reactor was operated at a pressure of 4 barg and at temperature of about 410° C.

The catalyst, prepared according to the procedure of example 9, was continuously injected into the reactor in the form of a suspension in white oil with a syringe system. The ratio between solid catalysts and the reactive phase mass was 3.5% wt. The total depolymerization time was about 3 hours. At the end, the reactor was allowed to cool down and opened for cleaning.

The gaseous phase of the reactor was sent to a condensation unit, formed by a cooling/scrubber column working at a 25° C., from which a liquid and gaseous stream were obtained. The resulting gaseous stream was vented while the condensed liquid stream was analyzed via GC-FID. The results of the analysis are reported by grouping the resulting compounds according to retention time, using specific hydrocarbons as internal retention time standards. Results are shown in Table 3.

Residual content was calculated excluding the amount of catalyst and the inorganic component originally present in the real plastic waste.

Comparative Example 5

Thermal Depolymerization Run

Using the process set up and conditions described in example 14, a depolymerization experiment was carried out, except no catalyst was fed.

Results in terms of mileages in products (with respect to the feedstock) are reported in Table 3 as well as the GC-FID analytical report made on the sample of oil produced.

Comparative Example 6

Using the process set up and conditions described in example 14, a depolymerization experiment was carried out, except CBV400 HY Zeolite was used as depolymerization catalyst.

Results in terms of mileages in products (with respect to the feedstock) are reported in Table 3 as well as the GC-FID analytical report made on the sample of oil produced.

TABLE 1

| Ex # | Feed type | Catal type | S. wt % | L. wt % | G. wt % | LF1 Wt % | LF2 Wt % | LF3 Wt % | LF4 Wt % | I.O.I. |
|---|---|---|---|---|---|---|---|---|---|---|
| Comp. 1 | PP | No | 7 | 73 | 20 | 2.4 | 45 | 51 | 1.6 | 0.07 |
| Comp. 2 | PP | HY | 0 | 84 | 16 | 3 | 45 | 52 | 0 | 1.75 |
| Comp. 3. | PP | SiO2 | 2.3 | 74 | 24 | 2.6 | 41 | 55 | 1 | 0.07 |
| 1 | PP | SiPMo-A | 1 | 81 | 18 | 5 | 43 | 50 | 2 | 0.17 |
| 2 | PP | AlWSi-A | 0 | 85 | 15 | 5 | 31 | 64 | 0 | 1.64 |
| 3 | PP | AlPW-A | 6 | 78 | 16 | 8 | 50 | 43 | 0 | 0.95 |
| 4 | PP | BetaWSi-A | 0 | 77 | 23 | 30 | 45 | 25 | 0 | 1.89 |
| 5 | PP | SiWSi-A | 0 | 84 | 16 | 8 | 49 | 43 | 0 | 2.03 |
| 6 | PP | SiPW-A | 3 | 81 | 16 | 8 | 44 | 47 | 1 | 1.94 |
| 7 | PP | SiWSi-A | 0 | 84 | 16 | 7.5 | 47 | 45.5 | 0 | 1.68 |

TABLE 2

| Ex # | Feed type | Catal type | S. wt % | L. wt % | G. wt % | LF1 Wt % | LF2 Wt % | LF3 Wt % | LF4 Wt % | I.O.I. |
|---|---|---|---|---|---|---|---|---|---|---|
| Comp. 4 | Rpw | no | 26 | 59 | 15 | 9 | 35 | 51 | 6 | 0.14 |
| 8 | Rpw | TiWSi-A | 12 | 71 | 17 | 7 | 37 | 52 | 3 | 0.20 |
| 9 | Rpw | SiWSi-A | 9 | 62 | 29 | 10 | 40 | 48 | 3 | 0.27 |
| 10 | Rpw | SiPW-A | 10 | 71 | 19 | 9 | 45 | 45 | 2 | 0.27 |
| 11 | Rpw | SiWSi-A | 15 | 63 | 22 | 3.5 | 45.1 | 50.6 | 0.8 | 0.19 |
| 12 (21626/38) | Rpw | SiWSi-A/Cu | 20 | 50 | 30 | 3 | 44 | 50 | 3.0 | 0.18 |
| 13 (21626/57) | Rpw | SiWSi-A/Zn | 13 | 64 | 23 | 2 | 38 | 60 | 0.0 | 0.18 |

TABLE 3

| Ex | Catal | S wt % | L. wt % | G. wt % | BP < 98° C. wt % | 98° C. < BP < 203° C. wt % | 203° C. < BP < 365° C. wt % | 365° C. < BP < 434° C. wt % | BP > 434° C. wt % | I.O.I. |
|---|---|---|---|---|---|---|---|---|---|---|
| 14 | SiWSi-A | 10 | 63 | 27 | 2 | 33 | 65 | 1 | 0 | 0.37 |
| Comp. 5 | no | 26 | 60 | 14 | 2 | 35 | 59 | 3 | 1 | 0.25 |
| Comp 6 | HY | 23 | 58 | 19 | 1 | 42 | 50 | 4 | 3 | 0.32 |

Example 15

The catalyst prepared according to Example 9 was used in a depolymerization run with a real plastic waste (RPW) sample as a depolymerization feedstock. The real plastic waste was made from or containing about 94 wt % of polyolefin, wherein the PP/PE ratio was about 30/70, traces of other polymers (PET, PS, PA, and PU), and inorganic contaminants. In addition, 2.5% wt of Fulcat 435, based on the amount of RPW, was used. Fulcat 435 was a poison-suppressing phyllosilicate, which was commercially available from BYK Chemie GmbH. The results are reported in Table 4.

Example 16

The depolymerization was carried out according to the same catalyst and conditions of Example 15, except ZrH$(PO)_4$ was used instead of Fulcat 435. ZrH$(PO)_4$ was commercially available from Merck-Sigma Aldrich. The results are reported in Table 4.

Example 17

The depolymerization was carried out according to the same conditions of Example 15, except (a) the catalyst used was prepared as described in example 2 and (b) acid treated $Al_2O_3$ was used as the catalyst support. The results are reported in Table 4.

Comparative Example 7

The depolymerization was carried out according to the same conditions of Example 15, except no catalyst and no poison suppressing agent were used. The results are reported in Table 4.

TABLE 4

| Ex # | Feed type | PSA type | Catal type | S wt % | L. wt % | G. wt % | LF1 Wt % | LF2 Wt % | LF3 Wt % | LF4 Wt % | I.O.I. |
|---|---|---|---|---|---|---|---|---|---|---|---|
| 15 | Rpw | Fulcat 435 | SiWSi-A | 19 | 62 | 19 | 3.0 | 44.0 | 53.0 | 0.0 | 0.36 |

TABLE 4-continued

| Ex # | Feed type | PSA type | Catal type | S wt % | L. wt % | G. wt % | LF1 Wt % | LF2 Wt % | LF3 Wt % | LF4 Wt % | I.O.I. |
|---|---|---|---|---|---|---|---|---|---|---|---|
| 16 | Rpw | ZrHP | SiWSi-A | 12 | 69 | 19 | 1.0 | 39.0 | 60.0 | 0.0 | 0.41 |
| 17 | Rpw | Fulcat 435 | AlPW-A | 14 | 65 | 21 | 3.0 | 39.0 | 58.0 | 0.0 | 0.32 |
| Comp 7 | Rpw | no | no | 29 | 56 | 15 | 2.0 | 51.0 | 47.0 | 0.0 | 0.18 |

PSA = Poison-suppressing agent

What is claimed is:

1. A process for depolymerizing plastics, comprising:

a) providing a plastic waste feed stock comprising recycled polypropylene and polyethylene, and melting the waste feed stock to form a melt product;

b) subjecting the melt product obtained in (a) to a temperature ranging from 280° C. to 600° C. in a first depolymerization reactor which is an agitated vessel, thereby obtaining a depolymerization product, wherein the depolymerization product comprises a gaseous stream which is sent to a condensation unit;

wherein the melt product is contacted with a catalyst comprising a support and a heteropolyacid, wherein the catalyst is a supported heteropolyacid, wherein the heteropolyacid comprises a transition metal portion containing one or more transition metals selected from the group consisting of W, Mo, and V and a non-metal portion containing one or more non-metal elements selected from the group consisting of Si, P, and As c) at least partially condensing the gaseous stream to form a condensed product, wherein the condensed product contains an oily condensed depolymerized product made from hydrocarbons;

d) subjecting the condensed product to a second depolymerization reactor carried out in the presence of the catalyst thereby producing a first liquid depolymerization product and a gaseous depolymerization product;

e) recycling the catalyst and part of the first liquid depolymerization product back to the first depolymerization reactor, and discharging a solid residue from the first depolymerization reactor; and f) condensing a gaseous effluent coming from the second depolymerization reactor thereby obtaining a second liquid depolymerization product.

2. The process of claim 1, wherein the catalyst is present in an amount ranging from 0.1-20 wt. %, with respect to the total weight of plastic waste feedstock and catalyst.

3. The process according to claim 1, wherein the plastic waste feedstock comprises a mixture of polyethylene and polypropylene in a weight ratio 85:15 to 15:85.

4. The process according to claim 1, wherein the support is an inorganic oxide.

5. The process according to claim 1, wherein the one or more transition metals is W or Mo.

6. The process according to claim 5, wherein the heteropolyacid further comprises additional transition metal compounds (ATMC) in an amount such that the molar ratio between (i) the one or more transition metal compound comprising W or Mo and (ii) the ATMC ranges from 0.5 to 100.

7. The process according to claim 1, wherein the one or more non-metal elements is Si or P.

8. The process according to claim 7, wherein the one or more non-metal elements is Si.

9. The process according to claim 1, wherein the one or more transition metals is present in an amount ranging from 0.5 to 20 wt. %, with respect to a total weight of the catalyst.

10. The process according to claim 1, wherein the catalyst comprises supported tungstosilicic acid (TSA).

11. The process according to claim 8, wherein the catalyst comprises silica supported tungstosilicic acid (TSA).

12. The process according to claim 9, wherein the one or more transition metals is W, and is present in an amount ranging from 1 to 15 wt. %, based on the total weight of the catalyst.

13. The process according to claim 1, wherein the first and second liquid depolymerization product is present in an amount higher than 60 wt. %, based on a total weight of the plastic waste feedstock.

14. The process according to claim 1, wherein the depolymerization product comprises a C28 or higher fraction and wherein the C28 or higher fraction is present in an amount equal to or lower than 4 wt. %, based on a total weight of the plastic waste feedstock.

15. The process according to claim 1, wherein the Internal Olefin Index (I.O.I) of the liquid depolymerization product is no more than 1.

* * * * *